May 9, 1967  P. C. FELIX  3,318,486
GRAVITY FLOW DISPENSING BODY
Filed Feb. 26, 1965  2 Sheets-Sheet 1

INVENTOR
PAUL C. FELIX

BY *Rupert J. Brady*
ATTORNEY

May 9, 1967  P. C. FELIX  3,318,486
GRAVITY FLOW DISPENSING BODY
Filed Feb. 26, 1965  2 Sheets-Sheet 2
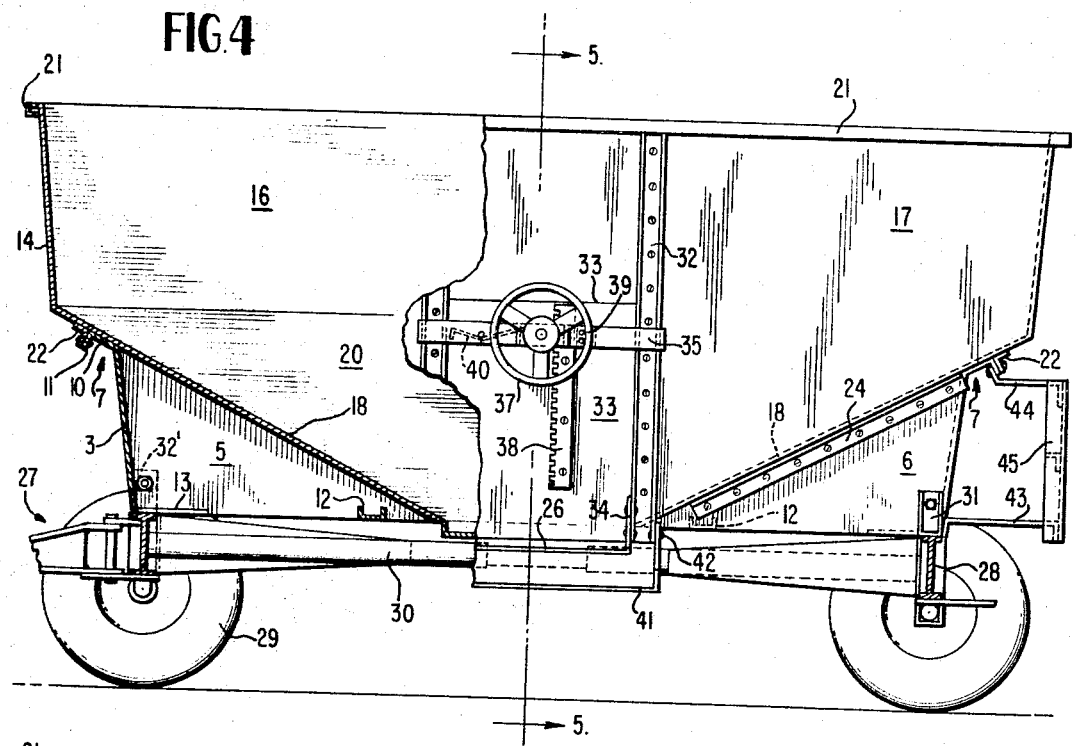
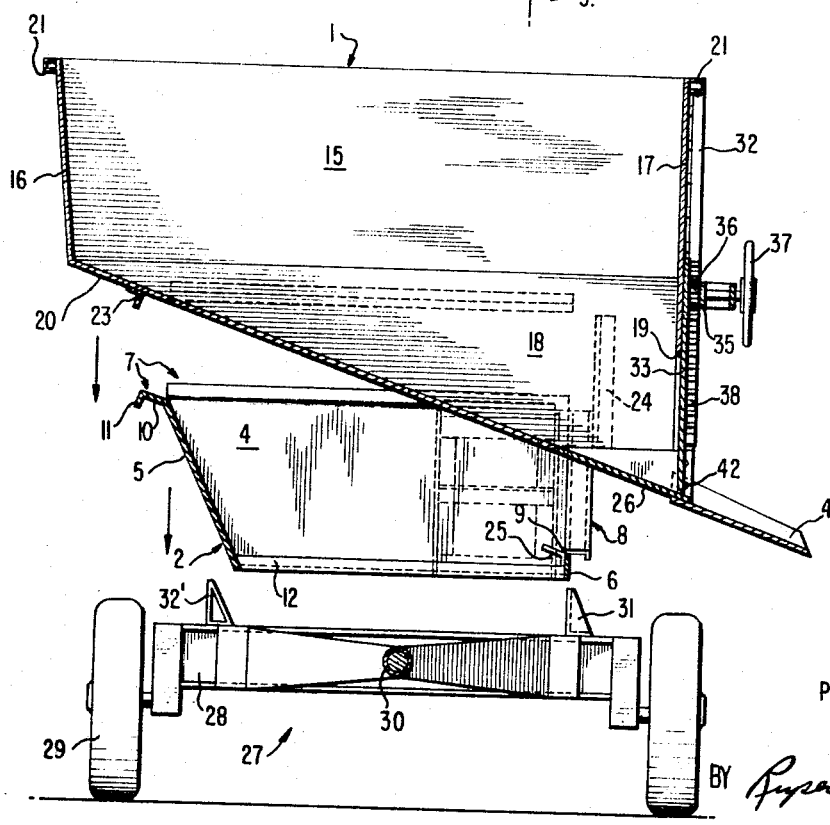
INVENTOR
PAUL C. FELIX
BY *Rupert J. Brady*
ATTORNEY

United States Patent Office 3,318,486
Patented May 9, 1967

3,318,486
GRAVITY FLOW DISPENSING BODY
Paul C. Felix, Taylorville, Ill., assignor to Circle Steel Corporation, Taylorville, Ill., a corporation of Illinois
Filed Feb. 26, 1965, Ser. No. 435,500
7 Claims. (Cl. 222—143)

This invention relates broadly to agriculture gravity flow grain wagons and more particularly to a two-piece gravity flow grain body, adapted for nesting within like members for transportation to remote locations.

A gravity flow grain body is a rather bulky piece of equipment and for this reason has not been compatible for transportation over great distances, for sale in other distant markets, since its bulkiness results in exorbitant transportation costs. Up to the present time manufactures have not been able to sell gravity flow grain bodies outside a radius of approximately one hundred fifty miles from their point of manufacture because of the exorbitant shipping costs due to the bulkiness of the grain bodies. Grain bodies in the prior art have all been constructed so that it has been impossible for a transport carrier to carry a full maximum weight load when transporting grain bodies, and this is what has produced exorbitant shipping costs on the grain bodies. Because of the high shipping costs, manufacturers have not been able to remain competitive, in distant markets, pricewise with other grain body manufacturers in the immediate vicinity of those distant markets. For this reason there are many manufacturers of gravity flow grain bodies or similar type material-handling equipment throughout the country which manufacture and sell to only a very limited territory around the factory in which the grain bodies are manufactured. None of these manufacturers have been able to sell outside their own limited territories in competition with a manufacture in another vicinity because the transportation costs have made it economically unprofitable.

It is therefore an object of the present invention to provide a construction of gravity flow grain body which can be shipped to distant locales and be economically competitive with similar type grain bodies manufactured at the distant locale.

Another object of the invention is to provide a construction of gravity flow grain body whereby a plurality of such bodies can be stacked on a transportation carrier so as to allow the transportation carrier to carry a full maximum weight.

A further object of the invention is to provide a construction of gravity flow grain body which is adapted to be shipped in two main parts, adapted for nesting with similar parts, in quantities, for transportation.

Still a further object of the invention is to provide a novel construction of gravity flow grain body in which the upper hopper structure is easily assembled on a base structure, and in which the hopper structure and base structure have at least three downwardly converging walls, thus allowing quantities of the hoppers and base structures to be nested within each other.

Other and further objects of the invention reside in the connecting flange means between the hopper and base sections, and the closed construction of the base structure. Other and further objects of the invention will become apparent, to one skilled in the art, from the specification hereinafter following by reference to the accompanying drawings, in which:

FIG. 4 is a side elevational view, partly in longitudinal section showing the grain body assembled on the wagon gear; and FIG. 5 is an exploded cross sectional view taken substantially along line 5—5 of FIG. 4.

Figure 3:
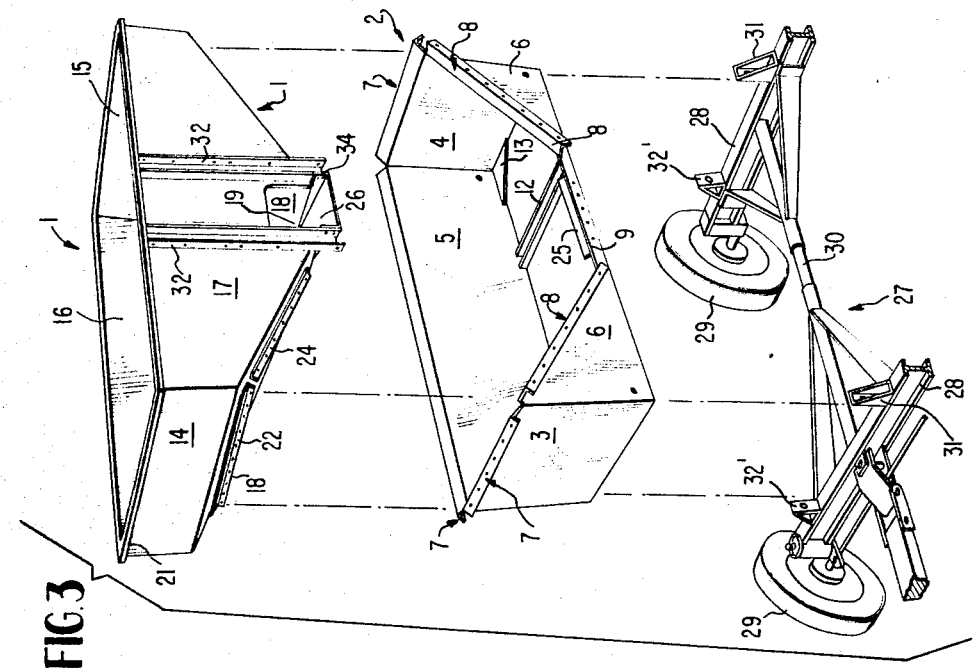
FIG. 3 is an exploded view of the grain body according to the invention, with portions of the wagon gear broken away.

Referring to the drawings in greater detail—the gravity flow grain body of the invention consists of two main components, the hopper structure indicated generally at 1, and the closed base structure indicated generally at 2. While the invention is described as a gravity flow grain body throughout the specification, it is to be understood that the structure is adapted to handle materials other than grain and the invention relates to a device for handling and unloading material, such as ear corn, feed, potatoes, beets, granular material, etc., as well as grain.

Figure 2:
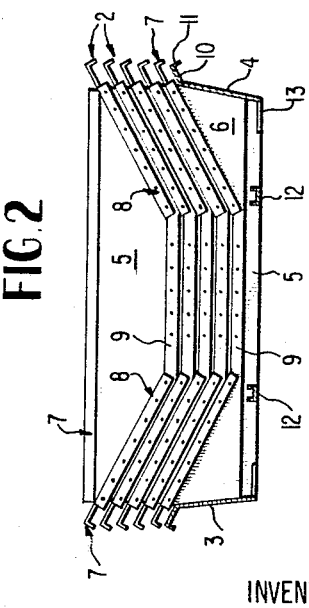
FIG. 2 is a view similar to FIG. 1 but showing a plurality of grain body base structures nested within each other for transportation.

The closed base structure 2 is provided with an open top, an open bottom, closed end wall portions 3 and 4, closed rear wall portion 5 and front wall portion 6. Closed end wall portions 3 and 4 and closed rear wall portion 5 converge inwardly toward each other at their bases, such that these three walls are tapered, that is, diverging from each other from the open bottom portion to the open top of the base structure. Front wall portion 6, as indicated more particularly in FIG. 5, is disposed substantially vertically, but could if desired be disposed in tapered relation similar to the other three walls. With at least three of the base structure wall portions 3, 4 and 5 disposed in tapered relation a plurality of base structures, 2 as indicated in FIG. 2, may be nested within each other to utilize space to a maximum during transportation and thus allow the transportation carrier to carry a full weight load, thereby reducing transportation costs for each unit. It has been found that an outward taper of approximately seven degrees from the vertical for end wall portions 3 and 4 will enable the units to nest within each other such that when nested the flanges or sills 7 of adjacent structures are separated by approximately the height of one flange. Rear wall portion 5 as indicated in FIG. 5 is tapered at a greater angle to the vertical due to the width of the hopper.

As shown in FIGS. 2 and 3, front wall portion 6 is provided with a generally V-shaped opening formed by a pair of front sills 8 extending upwardly in diverging relation with each other from the horizontal edge 9 extending across the central portion in front wall portion 6. Each of the sills 7 and 8 are integral with their respective wall portions, which are formed from sheet material, and consist of an intermediate portion 10 extending outwardly in angular relation to the respective wall portion, having the terminating edge portion 11 thereof connected at substantially right angles thereto in a downwardly extending position.

The sills 7 and 8 may therefore be extensions of the sheet material walls, of the base structure, formed in angular relation to the walls. To add rigidity to the closed base structure 2 a pair of cross braces 12 are connected between front and rear wall portions 5 and 6, across the open bottom of the structure, and the lower corners are reinforced with gussets in the usual manner as indicated at 13. This structure therefore provides a fully enclosed or base structure for the grain body which gives added strength to the body while providing additional safety factors, such as preventing any one from standing on the frame, which is easily done when the under structure of the grain body is open, as provided in the prior art grain bodies, and preventing protrusions from snagging in the base structure, which is a common occurrence with open-type base structures of the prior art which are constructed of angle irons or the like.

Hopper structure 1 consists of end wall portions 14 and 15, rear wall portion 16, and front wall portion 17 formed of sheet material and connected with each other to form a generally rectangular body portion in horizontal section. End wall portions 14 and 15 and rear wall portion 16 are relatively short, vertically, and are disposed at acute angles such as seven degrees or the like, with the vertical, diverging outwardly from each other toward the terminating top edges thereof. Front wall portion 17 is preferably vertically disposed as indicated, particularly in FIG. 5, and extends further in the vertical plane than the side and rear wall portions. Front wall portion 17 is substantially truncated V-shape in front elevation. The downwardly sloping bottom wall of the hopper is formed by bottom wall portions 18 connected to the lower terminating edges of end wall portions 14 and 15, and converging downwardly toward each other and connected to the lower terminating edges of front wall portion 17. The lower terminating edges of the pair of bottom wall portions 18 terminate in spaced relation to each other, substantially adjacent the edges of the generally rectangular opening 19 formed in front wall portion 17 along its lower edge. Rear wall portion 16 is connected to the pair of bottom wall portions 18 by bottom wall portion 20 which slopes downwardly from the lower terminating edge of rear wall portion 16 toward front wall portion 17, with its lower edge terminating at the intersection with the wall portions 18, thus forming a rectangular opening at the bottom of the hopper. The bottom portions 18 and 20 thus converge downwardly toward each other and toward the open bottom to form a hopper structure in which the material from all portions of the hopper structure 1 moves toward the rectangular opening 19 in front wall portion 17.

Figure 1:
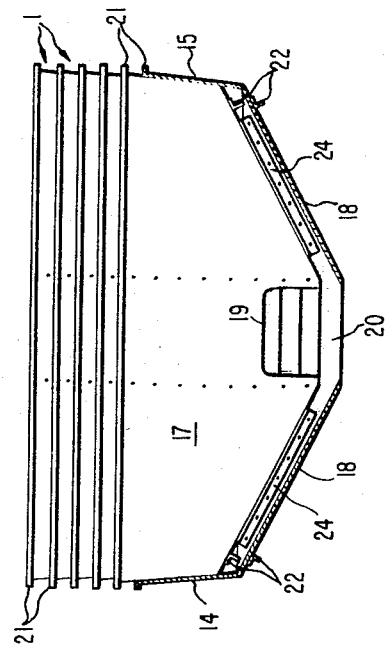
FIG. 1 is a side elevational view, partly in longitudinal section, showing a plurality of grain body hopper sections nested within each other for transportation.

The top edges of wall portions 14, 15, 16 and 17 are rolled, as indicated at 21, to strengthen the hopper structure 1 and to eliminate any sharp edges on the top of the grain body. A pair of end angle members 22 are connected at opposite ends of the hopper structure on bottom wall portions 18, somewhat downwardly of the lower terminating edges of end wall portions 14 and extending transversely across the hopper structure so as to register with sills 7 of end wall portions 3 and 4, of base structure 2, when hopper structure 1 is inserted within the base structure. Angle members 22, as well as the other angle members to be mentioned, may be connected to the bottom wall portions of the hopper structure by welding, or the like. In a similar manner a rear angle member 23 is connected to the bottom wall portion 20 of the hopper structure, extending longitudinally of the grain body so as to register with sill 7 of the base structure rear wall portion 5. Adjacent the lower terminating edges of front wall portion 17 and spaced somewhat inwardly on the pair of bottom wall portions 18, and extending longitudinally thereof, a pair of front angle members 24 are connected so as to register with the terminating edge portions 11 of front sills 8 connected to the front wall portion of the base structure. Angle members 22, 23 and 24 serve as cross-bracing to strengthen the hopper structure as well as means for connecting the hopper and brace structures. The members mentioned thus far are included in the hopper structures 1 and base structures 2 when they are shipped on a transportation body. Since walls 14, 15 and 16 of the hopper structure are tapered a plurality of the hopper structures may be nested within each other, as shown in FIG. 1, when shipped from one locale to another so as to enable the maximum weight per unit of area to be carried by the transportation carrier. Since three of the walls are tapered the units will easily slip in and out of each other without binding, and when stacked within each other their rolled edges 21 are usually separated by only approximately two inches. In a similar manner, since three of the wall portions 3, 4 and 5 of the closed base portion are tapered with the vertical, as shown in FIG. 2, a plurality of the base structures can be nested within each other for shipment in the same manner. Since three of the walls are tapered the units can be easily nested and unnested without binding and thus a plurality of the units can be shipped in the same cargo area that would normally be required for shipping a single base structure.

When assembling the grain body, the closed base structure 2 is first assembled on a standard wagon or running gear 27, well known in the art, which generally consists of a pair of I-beam axles 28 to which wheels 29 are connected with the front wheels connected to the axle through a standard type steering mechanism. The I-beams are usually connected together by means of a coupling member 30. A well-known wagon gear of this type adapted for use with the grain body of the invention is, for example, Wagon Gear Model 707 Grove Economy Line, manufactured by Grove Manufacturing Co., Shady Grove, Pa. The base structure 2 is secured to the I-beam axles 28 of the wagon gear by means of a pair of right angle brackets 31 and a pair of angular brackets 32', secured by bolts or the like to the upper surface of the I-beams and to the front wall portion 6 and rear wall portion 5, respectively, of the base structure.

An angle strap 25 is secured to horizontal edge 9 of front wall portion 6 of the base structure, as shown in FIGS. 3 and 5, with the upper portion of the angle strap disposed to fit flush against the bottom of the hopper structure. A hopper extension tray 26 is secured by bolts to the bottom of the hopper structure to close the bottom rectangular opening, and the hopper structure 1 is then inserted in or nested in base structure 2 so that angle members 22, 23 and 24 abut and register with the sills 7 and 8. The structures are then secured together by bolts connecting the mentioned angle members and sills and the bottom of extension tray 26 is bolted to angle strap 25. A pair of channel members 32 which serve as guides for sliding door 33 are bolted to the front wall portion 17 on opposite sides of rectangular opening 19 and to the front extensions of hopper extension tray 26 as indicated at 34. A cross bar support 35 is connected between channels 32 and serves as a support bearing for the pinion gear 36 connected for rotation by handwheel 37. A rack gear 38 is secured vertically of door 33 and is maintained in meshing relation with pinion gear 36 by guide 39, such that upon counterclockwise rotation of handwheel 37, as shown in FIG. 4, door 33 will move upwardly through the operation of the rack and pinion connection. A ratchet pawl 40 is connected to cross bars 35 for selective engagement with the pinion gear to retain door 33 at any desired door opening while unloading granular material from the hopper.

A chute 41 is pivotally connected at 42 to the lower ends of channels 32, beneath the hopper opening, to enable the grain body to unload directly into a feeder, elevator, or the like, without any adjustment. When the door is closed and the grain body is being moved from place to place, chute 41 may be pivoted into the vertical plane, not shown, and retained by an appropriate pivot bracket or the like.

A first horizontal bracket 43 is connected adjacent the lower terminating edge of end wall portion 4 of the base structure, as shown in FIG. 4, and a second horizontal bracket 44 is connected to the grain body above bracket 43 at the connection of flange 7 and end angle member 22. Ladder member 45 is connected to the outer ends of brackets 43 and 44 such that the ladder is spaced outwardly of base structure 2, which is recessed beneath the end wall of the hopper structure, thus allowing a person to climb up the ladder and observe the loading and unloading of the hopper. While the ladder has been shown connected to one end of the grain body it can be connected to any desired side of the grain body.

The grain body of the invention is thus shipped to distant locales in two main sections, as indicated at FIGS.

1 and 2, with a plurality of each type section nested within each other and if desired the plurality of nested hopper structures can then be placed on top of a plurality of nested base structures, thus economically conserving as much space as possible on the transportation carrier. The two main sections are then assembled on to a standard type wagon gear at their destination, where the wagon gear is normally supplied at the destination since wagon gears are readily available in most locales due to their diversified uses. After the two main sections are assembled to each other the door assembly and operating mechanism and the ladder assembly are then connected to the assembled grain body.

While the invention has been described in certain preferred embodiments it is realized that modifications can be made without departing from the spirit of the invention, such as tapering all four sides of the two main sections, and the like, and it is to be understood that no limitations upon the invention are intended other than those imposed by the scope of the appended claims.

What I claim as new and desire to secure by Letters Patent of the United States, is as follows:

1. A gravity flow material dispensing body of the type adapted for connection to a wagon gear comprising, a base structure having at least three upwardly diverging wall portions, flanges provided on the upper edges of said wall portions, a hopper member having at least three upwardly diverging side wall portions and a downwardly converging bottom wall means, said hopper member being partially nested in and supported by said base structure with said bottom wall means extending into said base structure, connecting means attached to said bottom wall means transverse and longitudinal thereof, and means connecting said connecting means to said flanges, whereby during shipment with the hopper member disconnected from said base structure a plurality of base structures may be nested within each other and a plurality of hopper members may be nested within each other.

2. A gravity flow material dispensing body as set forth in claim 1 in which said base structure includes four connected wall portions of sheet material, and said connecting means register with the flanges of the four wall portions of said base structure.

3. A gravity flow material dispensing body as set forth in claim 2 in which said sloping bottom wall means have four perimeter edges, and said connecting means are angle members attached adjacent the four perimeter edges of said sloping bottom wall means.

4. A gravity flow material dispensing body as set forth in claim 1 in which said flanges on the upper edges of said wall portions diverge outwardly therefrom and are integral with said wall portions.

5. A gravity flow grain body as set forth in claim 1 including a fourth wall portion on said base structure, flange portions on the upper edges of said fourth wall portion diverging upwardly from each other and defining an opening in said fourth wall portion for receiving said bottom wall means.

6. A gravity flow material dispensing body as set forth in claim 1 in which said base structure has a lower terminating edge, a first substantially horizontally extending bracket connected to said base structure adjacent the lower terminating edge, a second substantially horizontally extending bracket connected at the connection between one of said flanges and the respective connecting means, and a ladder member connected to said first and second brackets in spaced relation to said base structure.

7. A gravity flow material dispensing body as set forth in claim 5 in which said hopper member includes a fourth wall member spaced outwardly of said fourth wall portion of said base structure, door means connected adjacent the lower edge of said fourth wall member, and an extension member connected to said bottom wall means and said fourth wall member beneath said door means and extending beyond said fourth wall portion of said base structure.

References Cited by the Examiner

UNITED STATES PATENTS

| 1,099,004 | 6/1914 | Wright | 298—24 |
| 1,949,195 | 2/1934 | Yant | 298—29 |
| 2,246,497 | 6/1941 | Beck | 222—185 X |
| 2,827,204 | 3/1958 | McCurdy | 298—24 |
| 3,083,879 | 4/1963 | Coleman | 222—185 X |

FOREIGN PATENTS 814,727   6/1959   Great Britain.

ROBERT B. REEVES, *Primary Examiner.*

WALTER SOBIN, *Examiner.*